June 9, 1925.
J. H. WHITE
1,541,301
SOLDERING DEVICE AND MATERIAL
Filed Jan. 16, 1924
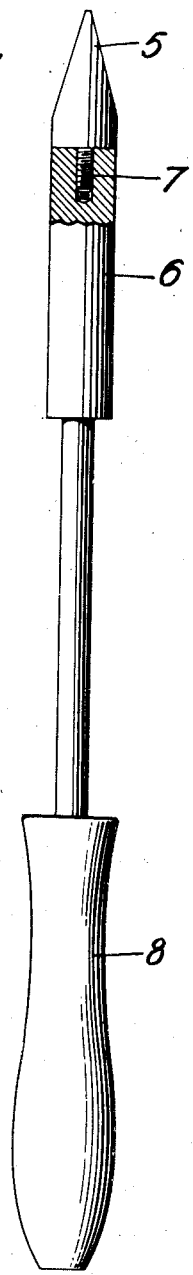
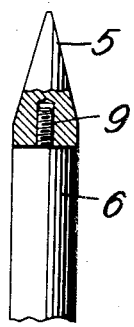
Inventor:
John H. White
by ⎯⎯ Atty.

Patented June 9, 1925.

1,541,301

UNITED STATES PATENT OFFICE.

JOHN H. WHITE, OF CRANFORD, NEW JERSEY, ASSIGNOR TO WESTERN ELECTRIC COMPANY, INCORPORATED, OF NEW YORK, N. Y., A CORPORATION OF NEW YORK.

SOLDERING DEVICE AND MATERIAL.

Application filed January 16, 1924. Serial No. 686,515.

*To all whom it may concern:*

Be it known that I, JOHN H. WHITE, a citizen of the United States of America, residing at Cranford, in the county of Union and State of New Jersey, have invented certain new and useful Improvements in Soldering Devices and Materials, of which the following is a full, clear, concise, and exact description.

This invention relates to metallic compositions, and particularly to alloys for use in soldering tools.

Its object is to provide an improved tip or working surface for such tools, which has a high melting point, is non-oxidizable at high temperatures, and with which the solder will form a surface alloy—a process commonly known as "wetting" or "tinning" the tool.

In accordance with one embodiment of the invention, a tip for soldering irons is formed of an alloy of nickel with a tantalum-metal. By the term "tantalum-metal" is meant a material having the properties of tantalum, such as tantalum itself, columbium, vanadium or an alloy of two or more of these metals.

While the proportions of the nickel and the tantalum-metal can be varied considerably without departing from the spirit and scope of the invention, those tips which have proved most satisfactory have been formed of an alloy containing not over 15% of the tantalum metal.

The tantalum-metal which has been found preferable is an alloy obtained by purifying and reducing the ore tantalite, which contains both tantalum and columbium. A tip composed of an alloy of nickel with approximately 5% of this material has proved very satisfactory for many purposes, including its employment with solders having a melting point to approximately 300° centigrade, such as disclosed in the copending application of J. B. Speed and A. H. Falk, Serial No. 685,666, filed June 11, 1924. Such tips are particularly applicable to the soldering of metallic articles, such as electrical conductors, which are coated with an insulating enamel, since most enamels used for this purpose may be decomposed by a high temperature to such an extent that the solder will readily adhere to the metal surface beneath the enamel. This avoids the preliminary cleaning of the enamelled surface which has heretofore been necessary. Because of its high melting point, its resistance to oxidation, and its ability to be "wet" by high melting point solders, a tip made in accordance with the invention is well adapted for use in soldering electrical conductors coated with certain heat resistant enamels such as those made in accordance with the processes disclosed in Patent 1,422,861, issued to C. D. Hocker on July 19, 1922.

The drawings illustrate certain applications of the invention.

Fig. 1 shows a soldering tool composed of a tip 5 made in accordance with this invention and attached to a stem 6 formed of copper or other metal by means of a threaded projection 7.

Fig. 2 shows the tip 5 attached to the stem 6 by means of a threaded projection 9 on the stem.

Fig. 3 shows the tip 5 welded upon the stem 6 whose end is pointed in conformity with the shape of the tip.

When the stem of a tool such as shown in Figs. 2 and 3 is made of copper, the strength of the joint tends to increase as the tool is heated, inasmuch as the copper has a higher coefficient of expansion than any of the compositions made in accordance with this invention.

If desired, both the stem and the tip of the tool may, of course, be made of a tantalum-metal.

All proportions given herein are by weight unless it is otherwise stated.

What is claimed is:

1. An alloy composed of nickel, tantalum, and columbium, the nickel constituting about 95% of the alloy.

2. A soldering surface for soldering tools comprising an alloy composed of nickel and not over 15% of a tantalum-metal.

3. A soldering surface for soldering tools comprising an alloy composed of nickel and approximately 5% of a tantalum-metal.

4. A soldering surface for soldering tools composed of nickel, tantalum, and columbium, the nickel constituting not less than 85% of the alloy.

5. In a soldering tool a soldering surface composed of nickel, tantalum and columbium, the nickel constituting approximately 95% of the alloy.

In witness whereof, I hereunto subscribe my name this 15th day of January A. D, 1924.

JOHN H. WHITE.